United States Patent
Shiraki et al.

(10) Patent No.: US 9,937,950 B2
(45) Date of Patent: Apr. 10, 2018

(54) ELECTRIC POWER STEERING CONTROL APPARATUS AND STEERING CONTROL METHOD

(71) Applicant: Mitsubishi Electric Corporation, Tokyo (JP)

(72) Inventors: Mamoru Shiraki, Kobe (JP); Katsuya Ikemoto, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 69 days.

(21) Appl. No.: 14/781,340

(22) PCT Filed: May 10, 2013

(86) PCT No.: PCT/JP2013/063150
§ 371 (c)(1),
(2) Date: Sep. 30, 2015

(87) PCT Pub. No.: WO2014/181463
PCT Pub. Date: Nov. 13, 2014

(65) Prior Publication Data
US 2016/0031478 A1 Feb. 4, 2016

(51) Int. Cl.
*B62D 5/04* (2006.01)

(52) U.S. Cl.
CPC .......... *B62D 5/0463* (2013.01); *B62D 5/046* (2013.01)

(58) Field of Classification Search
CPC .............................. B62D 5/0463; B62D 5/046
USPC ..................................................... 701/41–43
See application file for complete search history.

(56) References Cited

U.S. PATENT DOCUMENTS

| 2006/0001392 A1* | 1/2006 | Ajima | B62D 5/046 318/432 |
| 2010/0217487 A1* | 8/2010 | Murakami | B62D 5/0472 701/42 |
| 2016/0028335 A1* | 1/2016 | Dixon | H02P 23/03 318/432 |

FOREIGN PATENT DOCUMENTS

| EP | 1006042 A2 | 6/2000 |
| JP | 2007-314094 A | 12/2007 |
| JP | 4797565 B2 | 10/2011 |
| JP | 2012-218498 A | 11/2012 |
| JP | 2013-85474 A | 5/2013 |

OTHER PUBLICATIONS

Communication dated Nov. 23, 2016, issued by the European Patent Office in corresponding European Application No. 13884310.7.

(Continued)

*Primary Examiner* — Nga X Nguyen
(74) *Attorney, Agent, or Firm* — Sughrue Mion, PLLC; Richard C. Turner

(57) ABSTRACT

In a CPU (10) for calculating a control amount of an electric power steering control apparatus including a motor for assisting a steering force of a steering wheel generated by a driver of a vehicle, a filter section (18) subjects a value of a motor rotation speed calculating section (17) for calculating an rotation speed of a motor (4) to filter processing, to thereby output the resultant value to a target d-axis current value setting section (11b). With this configuration, in a high-torque and high-motor-rotation speed region, responsiveness of a target d-axis current value with respect to the motor rotation speed is decreased, to thereby suppress vibrations and noise when the steering wheel is operated.

20 Claims, 4 Drawing Sheets

(56) References Cited

OTHER PUBLICATIONS

International Search Report for PCT/JP2013/063150 dated Aug. 6, 2013.

* cited by examiner

ELECTRIC POWER STEERING CONTROL APPARATUS AND STEERING CONTROL METHOD

CROSS REFERENCE TO RELATED APPLICATIONS

This application is a National Stage of International Application No. PCT/JP2013/063150filed May 10, 2015, the contents of which are incorporated herein by reference in their entirety.

TECHNICAL FIELD

The present invention relates to an electric power steering control apparatus and a steering control method, and more particularly, to an electric power steering control apparatus and a steering control method capable of assisting a steering force of a steering wheel by an electric motor.

BACKGROUND ART

In a related-art electric power steering control apparatus, particularly in a high-speed-rotation region and a high-torque region, a torque ripple, noise, and vibrations easily occur as compared to other regions, which may give a driver a sense of discomfort and deteriorate a steering feeling. Therefore, in the related-art apparatus, in the high-torque region, so-called field weakening control has been performed (for example, see Patent Literature 1). In Patent Literature 1, a change rate of a d-axis current command value is limited so as to prevent rapid change in motor output and suppress generation of noise and vibrations. Further, in Patent Literature 1, a plurality of maps for calculating d-axis and q-axis current command values when the field weakening control is performed and a single map for calculating d-axis and q-axis current command values when the field weakening control is not performed are prepared, and those maps are switched for use.

CITATION LIST

Patent Literature

[PTL 1] JP 4797565 B2

SUMMARY OF INVENTION

Technical Problem

In the related-art apparatus of Patent Literature 1, the d-axis current command value is calculated with use of the maps, and then processing of controlling the change rate of the d-axis current command value is performed through software processing. Therefore, when the d-axis current command value whose change rate is limited is used, the responsiveness may be deteriorated due to the limitation. Further, in Patent Literature 1, the plurality of maps are stored, and one map is selected from those maps for use. In such a method of using the plurality of maps, there have been problems in that a software scale of a CPU is increased, and the software is complicated.

The present invention has been made to solve the above-mentioned problems, and has an object to provide an electric power steering control apparatus and a steering control method capable of, with a smaller scale software configuration, suppressing vibrations, noise, and the like to be generated when a steering wheel is operated, without limiting a d-axis current command value.

Solution to Problem

According to one embodiment of the present invention, there is provided an electric power steering control apparatus, including: a motor for assisting a steering force of a steering wheel generated by a driver of a vehicle; a torque sensor for detecting a steering torque of the steering force of the steering wheel; a motor rotation speed detecting section for detecting an rotation speed of the motor; a motor current detecting section for detecting a current value flowing through the motor; a target d-axis current setting section and a target q-axis current setting section for setting target currents to be supplied to the motor in a d-q coordinate system based on the steering torque detected by the torque sensor and the rotation speed of the motor detected by the motor rotation speed detecting section; a control amount calculating section for calculating a control amount for driving the motor based on a target d-axis current value set by the target d-axis current setting section, a target q-axis current value set by the target q-axis current setting section, and a current detection value detected by the motor current detecting section; a driving section for supplying a current to the motor based on the control amount from the control amount calculating section; and a filter section disposed between the motor rotation speed detecting section and the target d-axis current setting section, for subjecting the rotation speed of the motor detected by the motor rotation speed detecting section to filter processing, to thereby output the rotation speed subjected to the filter processing to the target d-axis current setting section.

Advantageous Effects of Invention

According to the one embodiment of the present invention, the electric power steering control apparatus includes: the motor for assisting the steering force of the steering wheel generated by the driver of the vehicle; the torque sensor for detecting the steering torque of the steering force of the steering wheel; the motor rotation speed detecting section for detecting the rotation speed of the motor; the motor current detecting section for detecting the current value flowing through the motor; the target d-axis current setting section and the target q-axis current setting section for setting the target currents to be supplied to the motor in the d-q coordinate system based on the steering torque detected by the torque sensor and the rotation speed of the motor detected by the motor rotation speed detecting section; the control amount calculating section for calculating the control amount for driving the motor based on the target d-axis current value set by the target d-axis current setting section, the target q-axis current value set by the target q-axis current setting section, and the current detection value detected by the motor current detecting section; the driving section for supplying the current to the motor based on the control amount from the control amount calculating section; and the filter section disposed between the motor rotation speed detecting section and the target d-axis current setting section, for subjecting the rotation speed of the motor detected by the motor rotation speed detecting section to filter processing, to thereby output the rotation speed subjected to the filter processing to the target d-axis current setting section. Therefore, with a smaller scale software configuration, vibrations, noise, and the like to be generated when the steering wheel is operated may be suppressed without limiting the d-axis current command value.

DESCRIPTION OF EMBODIMENTS

First Embodiment

Figure 1:
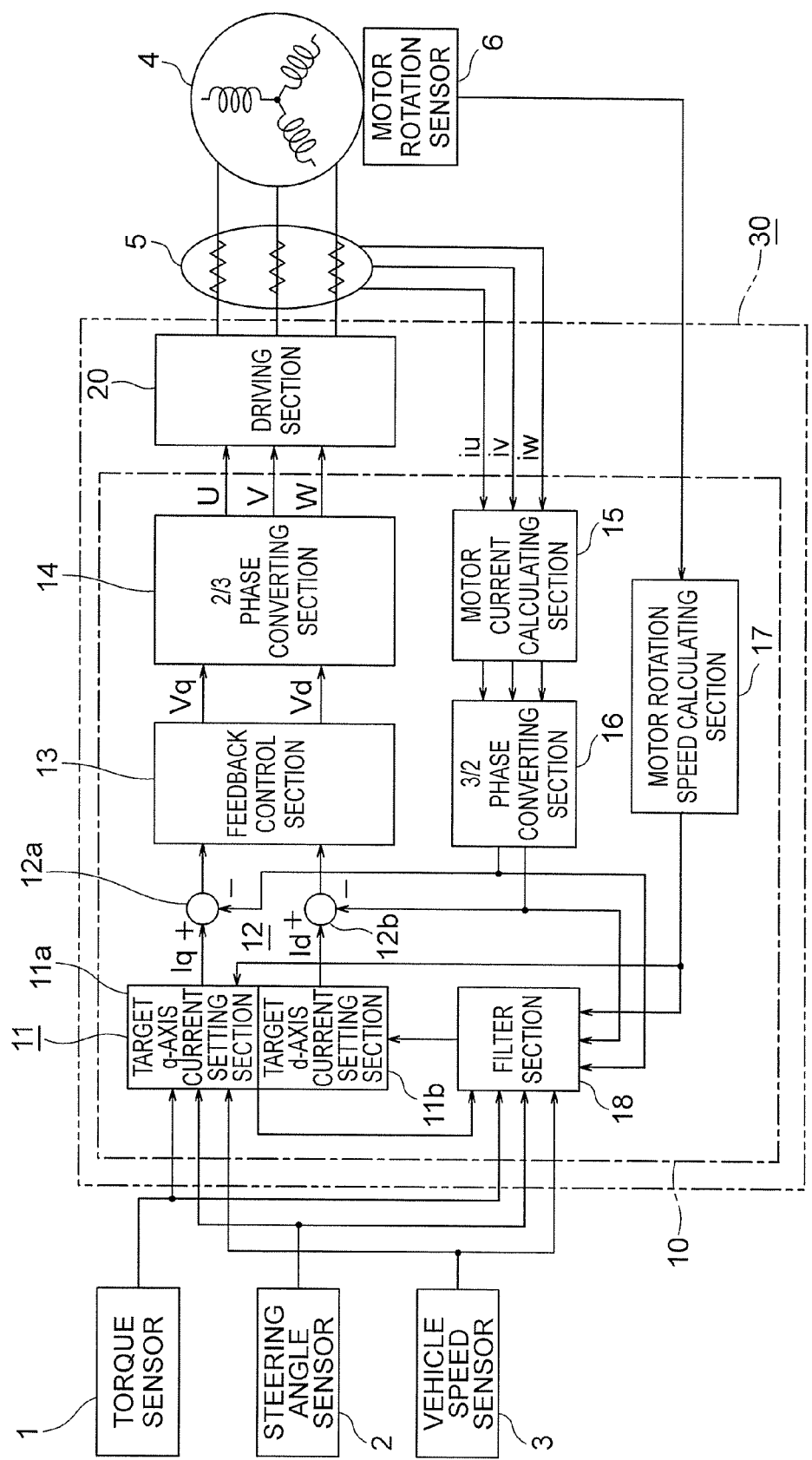
FIG. 1 is a block diagram for illustrating a configuration of an electric power steering control apparatus according to a first embodiment of the present invention.

Now, embodiments of the present invention are described with reference to the drawings. FIG. 1 is a block diagram for illustrating a configuration of an electric power steering control apparatus according to a first embodiment of the present invention. As illustrated in FIG. 1, the electric power steering control apparatus according to the first embodiment includes a torque sensor 1, a steering angle sensor 2, and a vehicle speed sensor 3. The torque sensor 1 is disposed in the vicinity of a steering wheel (not shown) of a vehicle, and detects a steering torque of a steering force of the steering wheel generated by a driver. The steering angle sensor 2 is disposed in the vicinity of the steering wheel, and detects a steering angle of the steering wheel. The vehicle speed sensor 3 is mounted on the vehicle, and detects the speed of the vehicle.

Further, the electric power steering control apparatus according to the first embodiment includes a motor 4 for assisting the steering force of the steering wheel generated by the driver of the vehicle, a control unit (ECU) 30 for calculating a target current value to be supplied to the motor 4, a motor current sensor 5 for detecting a current value flowing through the motor 4, and a motor rotation sensor 6 for detecting the rotation of the motor 4. The motor 4 is mounted on a steering column or a rack shaft of the vehicle. Note that, in this case, as the motor 4, a three-phase brushless motor is given as an example.

The control unit (ECU) 30 includes a CPU 10 serving as a core for calculation and processing, and a driving section 20 for driving the motor 4 based on an output signal of the CPU 10.

The CPU 10 inputs respective detection values from the torque sensor 1, the steering angle sensor 2, and the vehicle speed sensor 3, and calculates the current amount to be supplied to the motor 4 based on those detection values. Therefore, the CPU 10 includes a target current setting section 11 for calculating the target current value to be supplied to the motor 4. The target current setting section 11 is divided into a target q-axis current setting section 11a and a target d-axis current setting section 11b. Based on the steering force of the steering wheel generated by the driver, the target current setting section 11 sets, in a d-q coordinate system, the target current values to be supplied to the motor 4 for assisting the steering force.

Further, the CPU 10 includes a subtracting section 12 for determining a deviation between a target q-axis current output from the target current setting section 11 and a current detection value of the motor 4 and a deviation between a target d-axis current output from the target current setting section 11 and the current detection value of the motor 4. The subtracting section 12 is divided into a subtracting section 12a for the q-axis and a subtracting section 12b for the d-axis. Further, the CPU 10 includes a feedback control section 13 and a 2/3 phase converting section 14. The feedback control section 13 determines a final current value based on the deviations between the motor current detection value and the target current value calculated by the subtracting sections 12a and 12b so that the current detection value of the motor 4 follows the target current value, and converts the final current value into a voltage value to be output. The 2/3 phase converting section 14 converts the two-phase output signals output from the feedback control section 13 into three-phase signals. The output signals from the 2/3 phase converting section 14 are input to the driving section 20.

Further, the CPU 10 includes a motor current calculating section 15 for calculating the current detection value of the motor 4 based on the detection signals of the motor current sensor 5, and a 3/2 phase converting section 16 for converting the three-phase output signals from the motor current calculating section 15 into two-phase signals so as to input the two-phase signals to the subtracting sections 12a and 12b. Further, the CPU 10 includes a motor rotation speed calculating section 17 for calculating a motor rotation speed based on the detection signal of the motor rotation sensor 6.

Further, the CPU 10 includes a filter section 18 to which the motor rotation speed is input from the motor rotation speed calculating section 17. The output of the filter section 18 is input to the d-axis current setting section 11b. Note that, as illustrated in FIG. 1, various information are input to the filter section 18, and the filter section 18 determines whether or not to execute the filter processing based on at least one of those information. The execution conditions for determining whether or not to execute the filter processing are described later. The filter section 18 consists, for example, a low-pass filter, a band-pass filter, or a moving average processing filter.

Now, the operation of the electric power steering control apparatus according to the first embodiment of the present invention is described.

First, the torque sensor 1 detects the steering torque generated by the driver, the steering angle sensor 2 detects the steering angle of the steering wheel, and the vehicle speed sensor 3 detects the speed of the vehicle. The steering torque, the steering angle, and the vehicle speed are input to the CPU 10. Further, the motor rotation sensor 6 and the motor rotation speed calculating section 17 calculate the rotation speed of the motor 4. In the CPU 10, the target q-axis current setting section 11a and the target d-axis current setting section 11b of the target current setting section 11 respectively calculate the target q-axis current and the target d-axis current to be supplied to the motor 4 based on the steering torque, the steering angle, the vehicle speed, and the motor rotation speed. Note that, it is not always necessary to use all of the steering torque, the steering angle, and the vehicle speed, and the target q-axis current and the target d-axis current may be calculated based on only the steering torque and the rotation speed. The target q-axis current and the target d-axis current which are set by the target q-axis current setting section 11a and the target d-axis current setting section 11b of the target current setting section 11 are respectively input to the subtracting sections 12a and 12b. Into the subtracting sections 12a and 12b, the current detection value of the motor 4 calculated by the motor current calculating section 15 is input via the 3/2 phase converting section 16. The subtracting sections 12a and 12b respectively determine the deviation between the target q-axis current and the current detection value of the motor 4 and the deviation between the target d-axis current and the current detection value of the motor 4, and output the deviations to the feedback control section 13. The feedback control section 13 determines the final current value based on the deviations, and converts the final current value into a voltage value to be output. This voltage value is in two phases, and hence the 2/3 phase converting section 14 converts the two phases into three phases, and outputs the three phases to the driving section 20. The driving section 20 includes a plurality of switching elements (not shown), and performs PWM control with use of the switching elements, to thereby supply three-phase drive power to the motor 4. In this case, the subtracting section 12, the feedback control section 13, and the 2/3 phase converting section 14 construct a control amount calculating section for calculating a control amount for driving the motor 4 based on the target d-axis and q-axis currents and the current detection value of the motor 4.

In order to detect the current flowing through the motor 4, based on the detection signal of the motor current sensor 5, the motor current calculating section 15 calculates the current detection value of the motor 4. The current detection value is in three phases (iu, iv, and iw), and hence the 3/2 phase converting section 16 converts the three phases into two phases, which are respectively output to the subtracting sections 12a and 12b for the d- and q-axes. In this case, the motor current sensor 5, the motor current calculating section 15, and the 3/2 phase converting section 16 construct a motor current detecting section for detecting the motor current flowing through the motor 4. Further, the motor 4 is a blushless motor, and hence the motor 4 cannot be smoothly rotated unless the magnetic-pole position is detected. Therefore, the motor rotation speed calculating section 17 calculates the rotation speed of the motor 4 based on the detection signal of the motor rotation sensor 6. The rotation speed of the motor 4 is output to the target q-axis current setting section 11a, and is also output to the target d-axis current setting section 11b via the filter section 18. In this case, the motor rotation sensor 6 and the motor rotation speed calculating section 17 construct a motor rotation speed detecting section for detecting the rotation speed of the motor 4.

The motor current sensor 5 includes three resistors for U, V, and W phases, which are disposed between the driving section 20 and the motor 4, and calculates the current flowing through a motor coil of the motor 4 based on a potential difference generated across each of the resistors. However, the motor current sensor 5 is not limited to this type, and may be a sensor of an induction coil type using the current. Further, the motor rotation sensor 6 may employ a resolver system, a Hall sensor system, or an MR system. Further, as sensors for detecting the situation of the vehicle, three types of sensors including the torque sensor 1, the steering angle sensor 2, and the vehicle speed sensor 3 are used, but the sensors are not limited to those three types.

Next, the filter section 18, which is the feature of the present invention, is described. The filter section 18 is disposed between the motor rotation speed calculating section 17 and the target d-axis current setting section 11b, and subjects the motor rotation speed to filter processing. The output of the filter section 18 is transmitted to the target d-axis current setting section 11b.

The reason why the filter section 18 subjects the motor rotation speed to the filter processing is simply described. In general, the electric power steering control apparatus is mounted in the vicinity of the steering wheel, and hence the size of the motor thereof is desired to be as small as possible. However, in order to obtain a high output with a small-sized motor, it is necessary to set the d-axis current value to a large value. Therefore, even when the target d-axis current value is a small value in a region in which the rotation speed of the motor is low, the target d-axis current value may be significantly increased even with a small increase of the rotation speed. When the target d-axis current value rapidly changes with such a small rotation speed change, vibrations and noise may be generated. Therefore, in this embodiment, the filter section 18 subjects the motor rotation speed to be input to the target d-axis current setting section 11b to the filter processing as necessary, to thereby decrease the responsiveness of the target d-axis current value with respect to the motor rotation speed. Thus, the vibrations and the noise are suppressed.

As illustrated in FIG. 1, the filter section 18 inputs various information including the steering torque from the torque sensor 1, the steering angle from the steering angle sensor 2, the vehicle speed from the vehicle speed sensor 3, the motor current detection value from the 3/2 phase converting section 16, and the target current command value from the target current setting section 11. The filter section 18 determines whether or not to execute the filter processing based on at least one of those information. Further, the filter section 18 can change the filter characteristics and the execution conditions for determining whether or not to execute the filter processing.

When the filter section 18 determines to execute the filter processing, the filter section 18 subjects the motor rotation speed calculated by the motor rotation speed calculating section 17 to the filter processing, and outputs the motor rotation speed subjected to the filter processing to the target d-axis current setting section 11b. On the other hand, when the filter section 18 determines not to execute the filter processing, the filter section 18 directly outputs the motor rotation speed calculated by the motor rotation speed calculating section 17 to the target d-axis current setting section 11b, or performs filter processing for the normal operation to output the resultant motor rotation speed to the target d-axis current setting section 11b. Note that, the time constant for the normal operation is smaller than the filter time constant used when the above-mentioned filter processing is executed.

In view of this, the execution conditions for executing the filter processing by the filter section 18 are described. The filter section 18 executes the filter processing when any one of the following four execution conditions is satisfied.
(1) When the steering torque and the motor rotation speed are high
(2) When field weakening control is executed
(3) When change in motor current detection value is large
(4) When d-axis priority control is executed Now, those four execution conditions are described.
(1) When the Steering Torque and the Motor Rotation Speed are High When the steering torque and the motor rotation speed of the motor 4 are high, the filter section 18 executes the filter processing. Therefore, the filter section 18 sets in advance a first threshold for the steering torque and a second threshold for the motor rotation speed. The first threshold is a threshold representing a high torque region of the steering torque. A state in which the steering torque is higher than this threshold is called "high steering torque". Further, the second threshold is a threshold representing a high motor rotation speed region of the motor rotation speed. A state in which the motor rotation speed is higher than this threshold is called "high motor rotation speed". The filter section 18 monitors the steering torque of the torque sensor 1 and the motor rotation speed of the motor rotation speed calculating section 17, and determines whether or not the steering torque is equal to or more than the first threshold and the motor rotation speed is equal to or more than the second threshold. When the filter section 18 determines that the steering torque is equal to or more than the first threshold and the motor rotation speed is equal to or more than the second threshold, the filter section 18 determines to execute the filter processing. On the other hand, when the filter section 18 determines that at least one of the steering torque or the motor rotation speed is less than the threshold, the filter section 18 determines not to execute the filter processing. Note that, it is possible to calculate the motor rotation speed with use of the steering angle sensor 2 without using the motor rotation speed of the motor rotation speed calculating section 17. The steering angle sensor 2 can detect the rotation angle of the steering wheel per unit time, and calculate the rotation speed of the motor 4 based on the gear ratio of the motor 4. When the filter section 18 determines to execute the filter processing, the filter section 18 subjects the motor rotation speed input from the motor rotation speed calculating section 17 to the filter processing, and outputs the resultant motor rotation speed to the target d-axis current setting section 11b. With this, even when the steering torque and the motor rotation speed are high, which may generate vibrations and noise, the motor rotation speed is subjected to the filter processing, to thereby decrease the responsiveness of the target d-axis current with respect to the motor rotation speed. Thus, the generation of the vibrations and the noise can be suppressed in advance.

(2) When Field Weakening Control is Executed

In the electric power steering control apparatus according to the first embodiment, when the steering torque and the motor rotation speed of the motor 4 are high, the control unit (ECU) 30 executes the field weakening control. Therefore, the control unit (ECU) 30 sets in advance a third threshold for the steering torque and a fourth threshold for the motor rotation speed. The third threshold may be the same as the above-mentioned first threshold, and the fourth threshold may be the same as the above-mentioned second threshold. The control unit (ECU) 30 monitors the steering torque of the torque sensor 1 and the motor rotation speed of the motor rotation speed calculating section 17, and starts the field weakening control when the steering torque is equal to or more than the third threshold and the motor rotation speed is equal to or more than the fourth threshold. In addition, the control unit (ECU) 30 issues a command to the filter section 18 to execute the filter processing. The filter section 18 receives the command, subjects the motor rotation speed input from the motor rotation speed calculating section 17 to the filter processing, and outputs the resultant motor rotation speed to the target d-axis current setting section 11b. As described above, when the field weakening control is executed, the filter section 18 executes the filter processing, to thereby decrease the responsiveness of the target d-axis current with respect to the motor rotation speed. Thus, the vibrations and the noise, which are predicted to be eventually generated after the field weakening control is started, can be suppressed in advance.

(3) When Change in Motor Current Detection Value is Large

There is also a method of executing the filter processing by the filter section 18 when a phenomenon such as vibrations or noise is actually generated or when there is a sign of the generation, to thereby directly suppress the generation of the vibrations, the noise, and the like. Therefore, the filter section 18 inputs the d-axis current value in the motor current detection value from the 3/2 phase converting section 16, and detects whether or not the d-axis current has large fluctuations for each unit time or the change in the d-axis current per unit time is large. The filter section 18 sets in advance a fifth threshold for fluctuations of the d-axis current for each unit time and/or a sixth threshold for a change amount of the d-axis current per unit time. The fifth and sixth thresholds are thresholds representing the high change amount region of the current detection value. A state in which the change amount of the current detection value is higher than those thresholds is called "high change amount". When the filter section 18 determines that the fluctuations of the d-axis current for each unit time are equal to or more than the fifth threshold or the change amount of the d-axis current per unit time is equal to or more than the sixth threshold, the filter section 18 determines to execute the filter processing. When the filter section 18 determines to execute the filter processing, the filter section 18 subjects the motor rotation speed input from the motor rotation speed calculating section 17 to the filter processing, and outputs the resultant motor rotation speed to the target d-axis current setting section 11b. With this, also when the vibrations are actually generated or there is a sign of the generation of the vibrations, the filter section executes the filter processing, to thereby suppress the vibrations. In addition, there is an effect in that it is possible to respond to secular change of a mechanical system including the motor 4.

(4) When d-Axis Priority Control is Executed

In normal, control on the q-axis current is given priority, but when d-axis priority control is executed, which gives priority to control on the d-axis current, the filter section 18 executes the filter processing based on the driving situation of the vehicle. In this case, the target d-axis current is transmitted from the target d-axis current setting section 11b to the filter section 18. The filter section 18 sets in advance a seventh threshold for the target d-axis current (seventh threshold 0). When the target d-axis current transmitted from the target d-axis current setting section 11b is equal to or less than the seventh threshold, the filter section 18 determines to execute the filter processing. As a result, the motor rotation speed subjected to the filter processing is returned to the target d-axis current setting section 11b again. In this manner, the filter section 18 executes the filter processing, to thereby decrease the responsiveness of the target d-axis current with respect to the motor rotation speed. Thus, for example, when the d-axis priority control is started, when the control content is abruptly changed, or when the field weakening control is started, it is possible to cause those controls to act on the target d-axis current some time after those controls are switched, instead of immediately after the switching.

As described above, in the first embodiment, the electric power steering control apparatus includes: the motor 4 for assisting the steering force of the steering wheel generated by the driver of the vehicle; the torque sensor 1 for detecting the steering torque of the steering force of the steering wheel; the motor rotation speed detecting section (6, 17) for detecting the rotation speed of the motor 4; the motor current detecting section (5, 15, 16) for detecting the current value flowing through the motor 4; the target d-axis current setting section 11b and the target q-axis current setting section 11a for setting the target currents to be supplied to the motor 4 in the d-q coordinate system based on the steering torque detected by the torque sensor 1 and the rotation speed of the motor 4 detected by the motor rotation speed detecting section (6, 17); the control amount calculating section (12, 13, 14) for calculating the control amount for driving the motor 4 based on the target d-axis current value set by the target d-axis current setting section 11*b*, the target q-axis current value set by the target q-axis current setting section 11*a*, and the current detection value detected by the motor current detecting section (5, 15, 16); the driving section 20 for supplying the current to the motor 4 based on the control amount from the control amount calculating section; and the filter section 18 disposed between the motor rotation speed detecting section (6, 17) and the target d-axis current setting section 11*b*, for subjecting the rotation speed of the motor 4 detected by the motor rotation speed detecting section (6, 17) to the filter processing, to thereby output the rotation speed subjected to the filter processing to the target d-axis current setting section 11*b*. With this, in the first embodiment, according to the situation of the d-axis current with a possibility of generation of vibrations, such as high torque and high motor rotation speed, or when a sign thereof is first generated, the motor rotation speed is subjected to the filter processing, to thereby decrease the responsiveness of the d-axis current target value with respect to the motor rotation speed. Thus, the vibrations, the noise, and the like can be suppressed. Therefore, in the first embodiment, it is possible to suppress, with a small-scale software configuration, the vibrations, the noise, and the like to be generated when the steering wheel is operated, without limiting the target d-axis current value.

Second Embodiment

Figure 2:
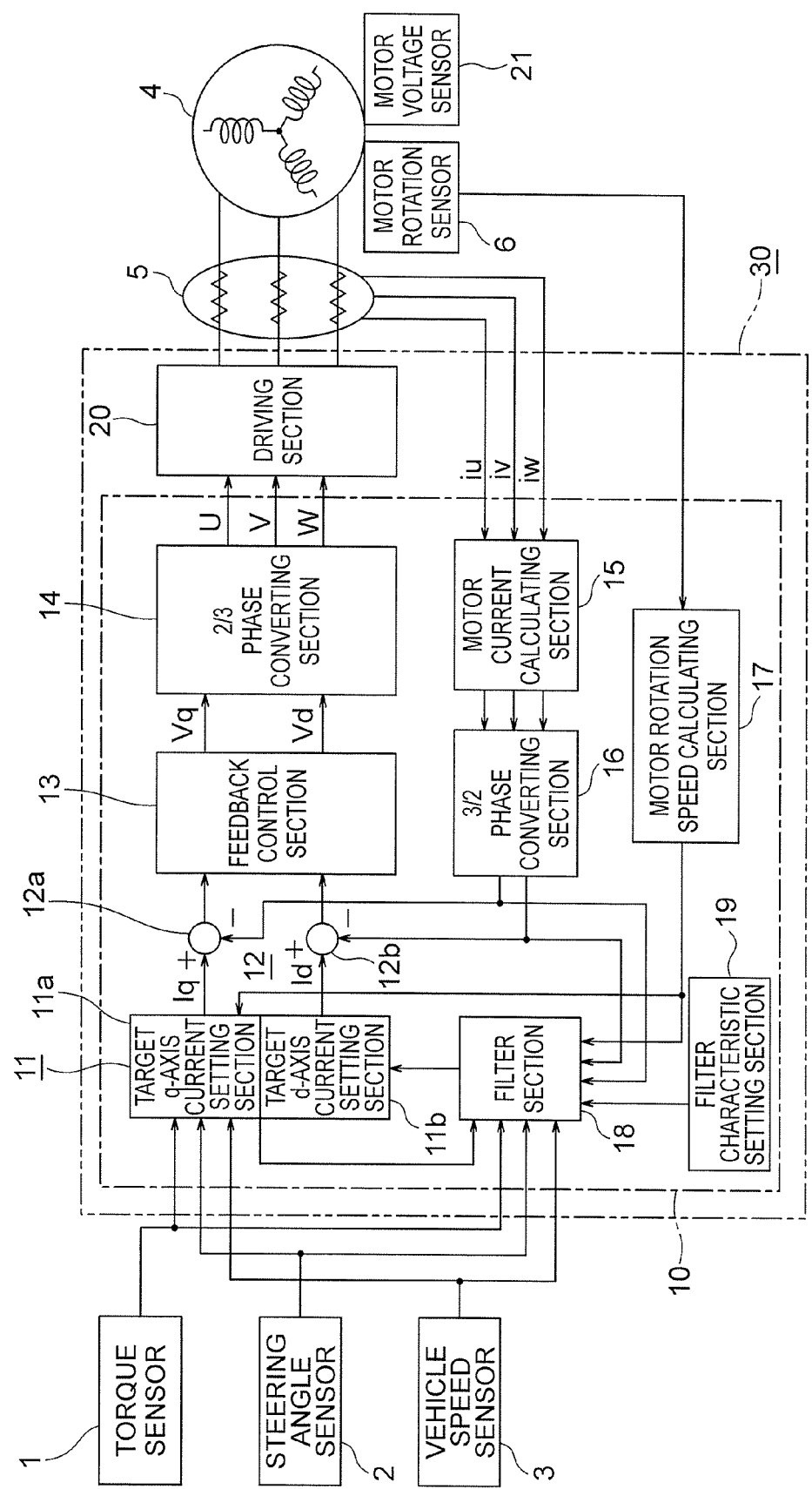
FIG. 2 is a block diagram for illustrating a configuration of an electric power steering control apparatus according to a second embodiment of the present invention.

Next, an electric power steering control apparatus according to a second embodiment of the present invention is described. In the second embodiment, the characteristics of the filter of the first embodiment and the setting method for the filter are described. FIG. 2 is a configuration diagram for illustrating the configuration of the electric power steering control apparatus according to the second embodiment of the present invention. The difference between FIG. 2 and FIG. 1 resides in that, in FIG. 2, a filter characteristic setting section 19 for setting the filter characteristics of the filter section 18 is added, and a motor voltage sensor 21 for detecting a voltage between terminals of the motor 4 is added. Other configurations and operations are the same as those in the first embodiment, and hence description thereof is omitted herein.

First, the filter characteristics (type of the filter, cutoff frequency, time constant, gain) of the filter section 18 are described.

As described above, the type of the filter constructing the filter section 18 is a low-pass filter, a band-pass filter, or a moving average processing filter. Namely, it is necessary that the filter is not a high-pass filter.

The cutoff frequency of the filter section 18 is preferred to be equal to or less than a resonance frequency of a mechanical system including a gear and the like, or equal to or less than a resonance frequency of electrical characteristics of the motor 4. Therefore, those resonance frequencies are grasped in advance by using measuring equipment or the like mounted on the vehicle. Then, the filter characteristic setting section 19 sets the cutoff frequency to a value equal to or less than those resonance frequencies.

The time constant and the gain of the filter in the filter section 18 are each normally set to an initial value (default value). However, the filter characteristic setting section 19 may automatically set the time constant and the gain of the filter depending on at least one of the steering torque, the vehicle speed, the target q-axis current, the q-axis motor current detection value, the target d-axis current, the d-axis motor current detection value, the temperature, the increasing and decreasing direction of the d-axis current, the increasing and decreasing direction of the motor rotation speed, the induced voltage generated in the motor 4, and the PWM duty ratio. Note that, as the motor rotation speed, the motor rotation speed calculated by the motor rotation sensor 6 may be used, but the present invention is not limited to this case. The steering angle sensor 2 may be used to calculate the motor rotation speed based on the steering angle detected by the steering angle sensor 2. The calculation method is the same as that described in the first embodiment. Further, the motor induced voltage is calculated as follows. The motor voltage sensor 21 is provided to the motor 4, and the motor voltage sensor 21 detects the voltage between the terminals of the motor coil, to thereby calculate the induced voltage based on the voltage between the terminals. Note that, in FIG. 2, for simplifying the drawing, only the motor voltage sensor 21 is illustrated, but in the actual case, the CPU 10 includes an induced voltage calculating section (not shown) for calculating the induced voltage based on the voltage between the terminals of the motor 4 which is detected by the motor voltage sensor 21. In this case, the motor voltage sensor 21 and the induced voltage calculating section construct an induced voltage detecting section for detecting the induced voltage based on the voltage between the terminals of the motor 4.

Further, as described above, by changing the setting of the time constant and the gain of the filter, the responsiveness of the target d-axis current can be decreased or increased. Therefore, by individually setting the time constant and the gain of the filter by the filter characteristic setting section 19, the steering wheel can be returned earlier, and thus there is an effect in that the following performance and the responsiveness can be secured when the control returns to normal control.

As described above, also in the second embodiment, an effect similar to that in the first embodiment can be obtained. Further, in the second embodiment, the filter characteristic setting section 19 is provided so that the filter section 18 can have variable filter characteristics. Therefore, the time constant and the gain of the filter characteristics of the filter section 18 can be adjusted, to thereby easily change the responsiveness.

Third Embodiment

Next, an electric power steering control apparatus according to a third embodiment of the present invention is described. In the third embodiment, conditions for canceling the execution of the filter processing of the filter section 18 in the above-mentioned first embodiment and second embodiment are described. The filter processing of the filter section 18 is performed to support particularly the suppression of the vibrations, the noise, and the like by decreasing the responsiveness of the target d-axis current. Therefore, the time constant of the filter during the execution of the filter processing is larger than the filter time constant during the normal control, and hence the responsiveness may be deteriorated when the control returns to the normal control. Therefore, similarly to the execution conditions for executing the filter processing of the filter section 18, canceling conditions for canceling the execution of the filter processing are also important.

Figure 3:
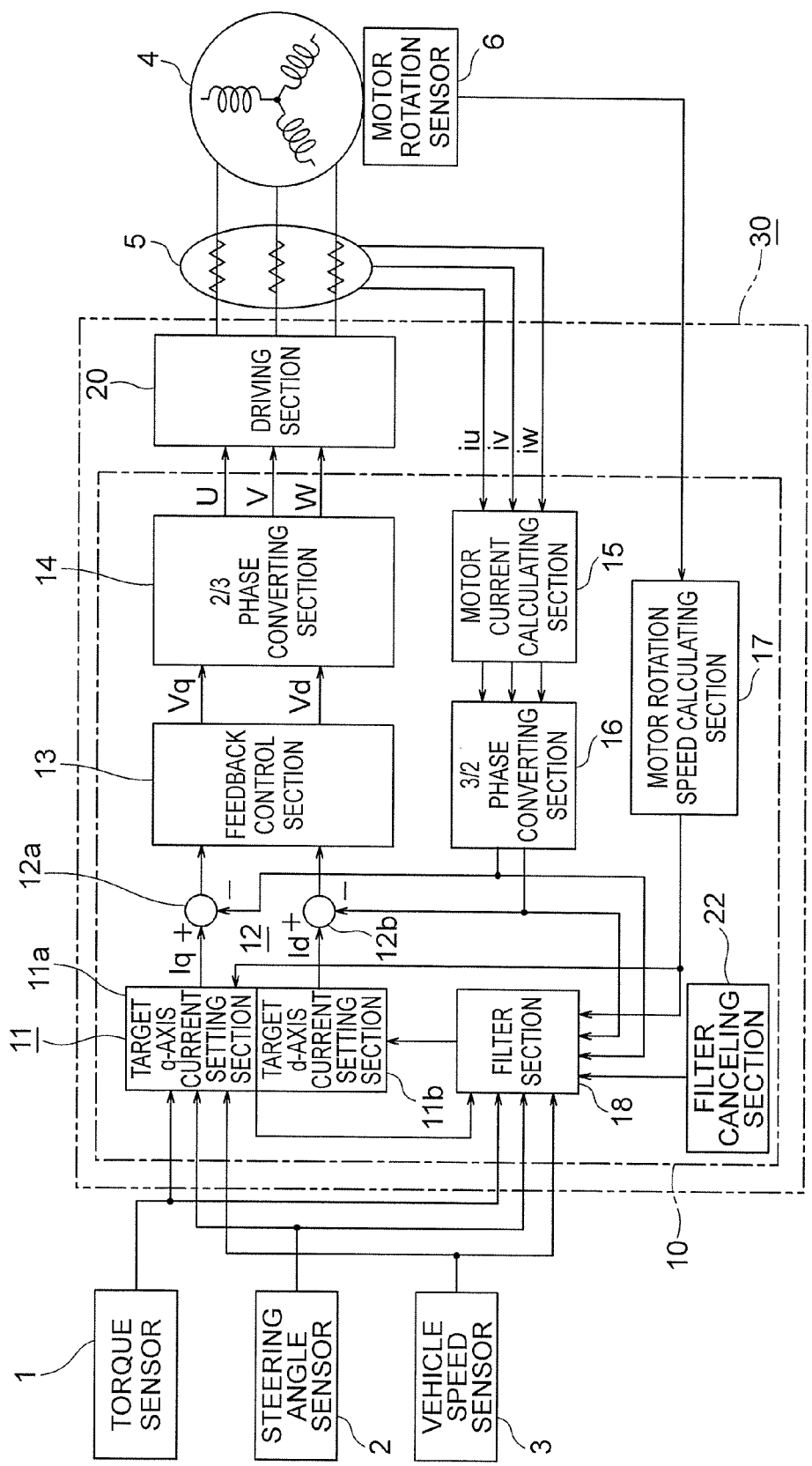
FIG. 3 is a block diagram for illustrating a configuration of an electric power steering control apparatus according to a third embodiment of the present invention.

FIG. 3 is a block diagram for illustrating the configuration of the electric power steering control apparatus according to the third embodiment. The difference between FIG. 3 and FIG. 1 resides in that, in FIG. 3, a filter canceling section 22 is provided. The filter canceling section 22 may be provided separately from the filter section 18 as illustrated in FIG. 3, or may be incorporated in the filter section 18. Note that, FIG. 3 is an example in which the third embodiment is applied to the first embodiment illustrated in FIG. 1, but the third embodiment may be applied to the second embodiment illustrated in FIG. 2. Other configurations and operations are the same as those in the first and second embodiments, and hence description thereof is omitted herein.

In the above-mentioned second embodiment, the time constant and the gain of the filter characteristics are variable. Therefore, the change speed on the gradual increase side of the filter time constant for exhibiting the filter effect and the change speed on the gradual decrease side of the filter time constant for suppressing the filter effect can be set independently of each other based on the steering situation. Therefore, under a steering situation where the filter effect is unnecessary, when the gradual decrease speed of the filter time constant is set faster than the gradual increase speed of the filter time constant, the filter effect can be canceled instantaneously. There are various canceling conditions being triggers for canceling the filter effect depending on the steering situation.

The canceling conditions are the following two.
(a) When the steering wheel is returned
(b) When all of the four execution conditions described in the above-mentioned first embodiment are unsatisfied When one of those canceling conditions is satisfied, the filter canceling section 22 issues a command to the filter section 18 to cancel the execution of the filter processing.

Now, those two canceling conditions are described.
(a) When the steering wheel is returned First, the first canceling condition is a case where a returning operation of the steering wheel is detected. Note that, the "returning operation" herein refers to a driver's operation of steering the steering wheel in the direction toward a neutral position. In contrast, a driver's operation of steering the steering wheel in the direction away from the neutral position is referred to as a "turning operation". When the returning operation of the steering wheel is detected, it is necessary to immediately cancel the execution of the filter processing of the filter section 18. Note that, the returning of the steering wheel can be detected based on the information on the sign of the motor rotation speed of the motor 4 (that is, positive or negative sign of the motor rotation speed), or the information on the steering angle detected by the steering angle sensor 2. Therefore, the filter canceling section 22 monitors the motor rotation speed of the motor rotation speed calculating section 17 or the steering angle of the steering angle sensor 2, and when it is determined that the driver has performed the returning operation of the steering wheel, the filter canceling section 22 issues a command to the filter section 18 to cancel the execution of the filter processing. In this case, the filter canceling section 22 constructs a steering wheel returning detecting section for detecting the returning operation of the steering wheel, and a filter canceling section for issuing a command to the filter section 18 to cancel the execution of the filter processing.

(b) When all of the four execution conditions described in the above-mentioned first embodiment are unsatisfied The filter canceling section 22 acquires, from the filter section 18, the determination result of whether the four execution conditions (1) to (4) described in the above-mentioned first embodiment are satisfied or unsatisfied. The filter canceling section 22 determines, based on the determination result, whether or not all of the four execution conditions (1) to (4) described in the above-mentioned first embodiment are unsatisfied. When it is determined that all of the four execution conditions (1) to (4) are unsatisfied as a result of the determination, the filter canceling section 22 outputs a command to the filter section 18 to cancel the filter processing.

In the above, description is given of an example in which, when the canceling condition is satisfied, the filter canceling section 22 entirely cancels the execution of the filter processing of the filter section 18. However, the execution of the filter processing may not be entirely canceled. For example, after the filter processing is canceled, any one of the execution conditions (1) to (4) may be satisfied again. Therefore, when the canceling condition is satisfied, the filter canceling section 22 may issue a command to the filter section 18 to change the cutoff frequency. With this, the cutoff frequency of the filter section 18 is once increased, and then, during a certain waiting period, the motor current detection value or the like is monitored to verify the situation. After that, the filter processing is canceled. This operation is also effective. The waiting period is set in advance to an arbitrary time period as appropriate, such as 1 minute, 5 minutes, and 10 minutes. Alternatively, the filter canceling section 22 may issue a command to perform processing of returning all the values of the filter characteristics of the filter section 18 to initial values. The initial values are default values for performing the filter processing during the normal operation, and at least the time constant is set to a value smaller than that of the filter processing performed when one of the above-mentioned four execution conditions (1) to (4) is satisfied. As described above, the command to cancel the filter processing output by the filter canceling section 22 is any one of a command to perform processing of entirely canceling the execution of the filter processing of the filter section 18, a command to perform processing of returning the filter characteristics of the filter section 18 to initial values, and a command to change the cutoff frequency of the filter section 18 to a value higher than the current value.

As described above, in this embodiment, an effect similar to that of the first embodiment can be obtained. In addition, the filter section 18 executes the filter processing when the filter processing for the motor rotation speed is necessary. When the filter processing becomes unnecessary, the filter canceling section 22 cancels the execution of the filter processing. Thus, the vibrations, the noise, and the like to be generated can be suppressed. Further, the method of the third embodiment is not a method of performing addition to the command value to the motor 4 itself, but a method of varying the input value to the target d-axis current setting section 11b. Therefore, even when the rating of the motor 4, the vehicle, and the like are changed, it is possible to easily respond to the change. Further, this method is applied to the input information, and hence the current control method is not required to be changed, and addition to the software is facilitated.

Fourth Embodiment

Figure 4:
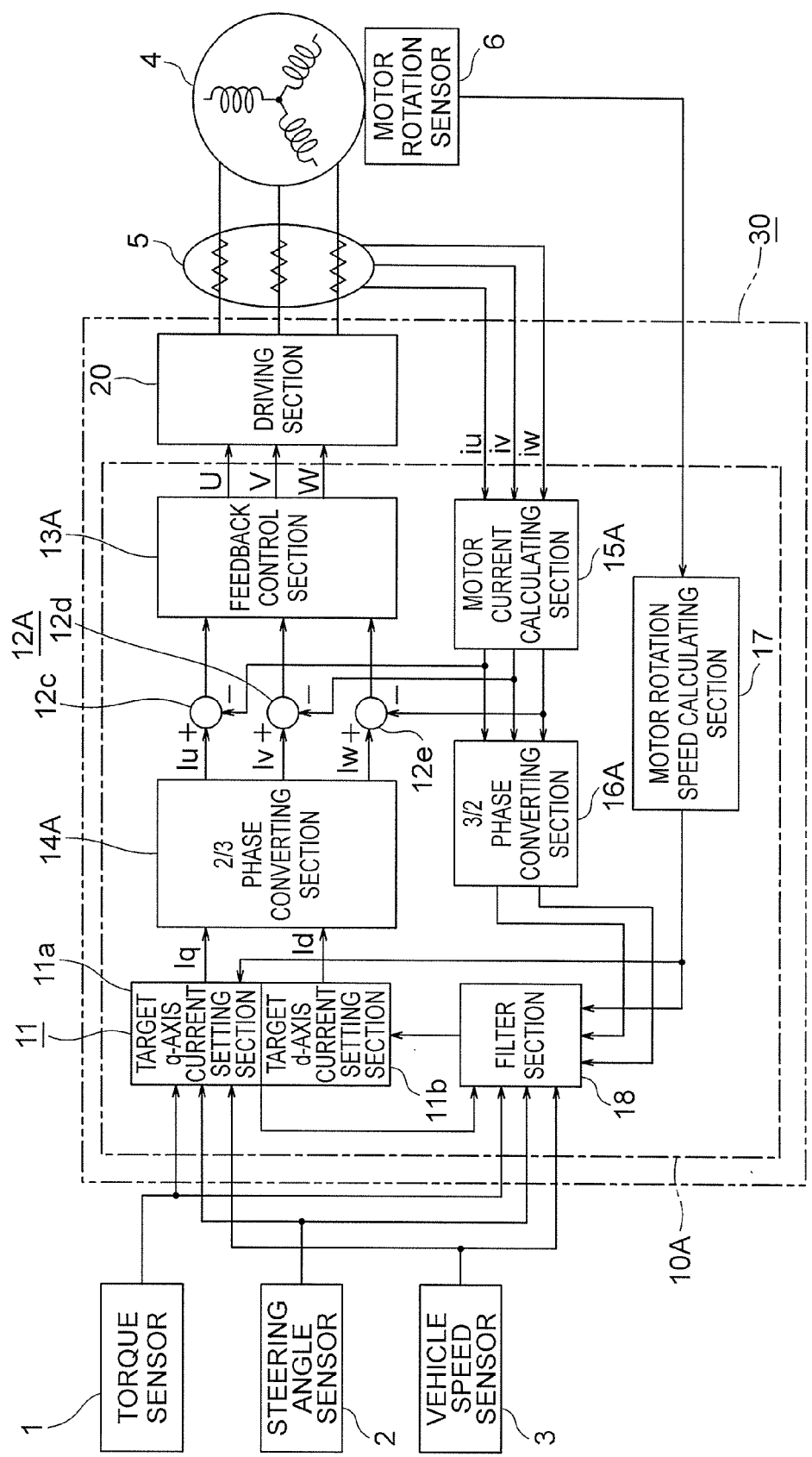
FIG. 4 is a block diagram for illustrating a configuration of an electric power steering control apparatus according to a fourth embodiment of the present invention.

Next, a fourth embodiment of the present invention is described. FIG. 4 is a block diagram for illustrating a configuration of an electric power steering control apparatus according to the fourth embodiment of the present invention.

The first difference between FIG. 4 and FIG. 1 resides in the configuration of the control amount calculating section. In FIG. 1, the control amount calculating section includes the subtracting section 12, the feedback control section 13, and the 2/3 phase converting section 14. However, in FIG. 4, the control amount calculating section includes a 2/3 phase converting section 14A, a subtracting section 12A (12c, 12d, and 12e), and a feedback control section 13A, and the connection order differs from that in FIG. 1. Further, in FIG. 4, the subtracting section 12A includes three subtracting sections 12c, 12d, and 12e.

Further, the second difference between FIG. 4 and FIG. 1 resides in output destinations of a motor current calculating section 15A and a 3/2 phase converting section 16A. In FIG. 1, the motor current detection value calculated by the motor current calculating section 15 is output only to the 3/2 phase converting section 16. On the other hand, in FIG. 4, the motor current detection value calculated by the motor current calculating section 15A is output to the subtracting sections 12c, 12d, and 12e and the 3/2 phase converting section 16A. Further, in FIG. 1, the output of the 3/2 phase converting section 16 is input to the subtracting section 12 and the filter section 18, but in FIG. 4, the output of the 3/2 phase converting section 16A is input to only the filter section 18.

Other configurations and operations are the same as those in the first embodiment, and hence description thereof is omitted herein.

In the fourth embodiment, as illustrated in FIG. 4, the 2/3 phase converting section 14A is disposed at the output stages of the target q-axis current setting section 11a and the target d-axis current setting section 11b, the subtracting section 12A is disposed at the output stage of the 2/3 phase converting section 14A, and the feedback control section 13A is disposed at the output stage of the subtracting section 12A. Therefore, after the target q-axis current setting section 11a and the target d-axis current setting section 11b set the target q-axis current and the target d-axis current, respectively, the 2/3 phase converting section 14A converts the two phases into three phases. After that, the subtracting sections 12c, 12d, and 12e determine the deviations between the motor current detection value output from the motor current calculating section 15 and the three-phase target currents (Iu, Iv, and Iw). Note that, the operation of calculating the motor current of the motor current calculating section 15A is the same as that of the motor current calculating section 15 of FIG. 1. The feedback control section 13A calculates the final target current value based on the deviations calculated by the subtracting sections 12c, 12d, and 12e so that the current detection value of the motor 4 follows the target current value, and outputs the final target current value to the driving section 20.

As described above, in the fourth embodiment, the electric power steering control apparatus includes: the motor 4 for assisting the steering force of the steering wheel generated by the driver of the vehicle; the torque sensor 1 for detecting the steering torque of the steering force of the steering wheel; the motor rotation speed detecting section (6, 17) for detecting the rotation speed of the motor 4; the motor current detecting section (5, 15A, 16A) for detecting the current value flowing through the motor 4; the target d-axis current setting section 11b and the target q-axis current setting section 11a for setting the target currents to be supplied to the motor 4 in the d-q coordinate system based on the steering torque detected by the torque sensor 1 and the rotation speed of the motor 4 detected by the motor rotation speed detecting section (6, 17); the control amount calculating section (14A, 12c, 12d, 12e, 13A) for calculating the control amount for driving the motor 4 based on the target d-axis current value set by the target d-axis current setting section 11b, the target q-axis current value set by the target q-axis current setting section 11a, and the current detection value detected by the motor current detecting section (5, 15A, 16A); the driving section 20 for supplying the current to the motor 4 based on the control amount from the control amount calculating section; and the filter section 18 disposed between the motor rotation speed detecting section (6, 17) and the target d-axis current setting section 11b, for subjecting the rotation speed of the motor 4 detected by the motor rotation speed detecting section (6, 17) to the filter processing, to thereby output the rotation speed subjected to the filter processing to the target d-axis current setting section 11b. With this, in the fourth embodiment, based on the situation of the d-axis current with a possibility of generation of vibrations, such as high torque and high motor rotation speed, or when a sign thereof is first generated, the motor rotation speed is subjected to the filter processing, to thereby decrease the responsiveness of the d-axis current target value with respect to the motor rotation speed. Thus, the vibrations, the noise, and the like can be suppressed. Therefore, in the fourth embodiment, it is possible to suppress, with a small-scale software configuration, the vibrations, the noise, and the like to be generated when the steering wheel is operated, without limiting the target d-axis current value.

Further, according to the fourth embodiment, the feedback control section 13A determines the control amount for the respective three phases (U, V, and W) to drive the motor 4. Therefore, there is an advantage in that, even when there is a difference in the coil wound inside the motor 4, such as a difference in the resistance value or the like, control suitable for each case can be performed.

As described above, even when the configuration of the control amount calculating section is different, the motor rotation speed is subjected to the filter processing by the filter section 18, to thereby vary the target d-axis current value. Thus, similarly to the above, the vibrations, the noise, and the like can be suppressed. Note that, when the filter section 18 does not use the information of the detected d-axis and q-axis currents, the 3/2 phase converting section 16 is unnecessary.

Note that, the filter characteristic setting section 19 and the motor voltage sensor 21 of FIG. 2 described in the second embodiment may be added to the configuration of FIG. 4. Similarly, the filter canceling section 22 of FIG. 3 described in the third embodiment may be added to the configuration of FIG. 4. In those cases, of course, effects similar to those of the second and third embodiments can be obtained.

REFERENCE SIGNS LIST 1 torque sensor, 2 steering angle sensor, 3 vehicle speed sensor, 4 motor, 5 motor current sensor, 6 motor rotation sensor, 10 CPU, 11 target current setting section, 11a target q-axis current setting section, 11b target d-axis current setting section, 12 subtracting section, 13 feedback control section, 14 2/3 phase converting section, 15 motor current calculating section, 16 3/2 phase converting section, 17 motor rotation speed calculating section, 18 filter section, 19 filter characteristic setting section, 20 driving section, 21 motor voltage sensor, 22 filter canceling section

The invention claimed is:
1. An electric power steering control apparatus, comprising:
a motor which assists a steering force of a steering wheel generated by a driver of a vehicle;
a torque sensor which detects a steering torque of the steering force of the steering wheel;
a motor rotation speed sensor which detects a rotation speed of the motor;

a motor current sensor which detects a current value flowing through the motor; and a hardware controller which performs the following operations:

sets target currents supplied to the motor in a d-q coordinate system based on the steering torque detected by the torque sensor and the rotation speed of the motor detected by the motor rotation speed sensor, calculates a control amount for driving the motor based on a target d-axis current value set by the controller, a target q-axis current value set by the controller, and a current detection value detected by the motor current sensor, supplies a current to the motor based on the control amount calculated by the controller, and subjects the rotation speed of the motor detected by the motor rotation speed sensor to filter processing, wherein the controller sets the target d-axis current value based on the rotation speed subjected to the filter processing.

2. The electric power steering control apparatus according to claim 1, wherein the controller performs the filter processing in response to at least one of a plurality of execution conditions being satisfied, and wherein the plurality of execution conditions comprise:
(i) when the steering torque is higher than a threshold representing a high torque region and the rotation speed of the motor is higher than a threshold representing a high rotation speed region;
(ii) when field weakening control is executed;
(iii) when a change amount of the current detection value is larger than a threshold representing a high change amount; and
(iV) when d-axis priority control is executed.

3. The electric power steering control apparatus according to claim 1, wherein a cutoff frequency in the filtering process performed by the controller is set to a value equal to or less than a resonance frequency of an electrical characteristic of the motor, or a value equal to or less than a resonance frequency of a mechanical system having the motor mounted thereon.

4. The electric power steering control apparatus according to claim 2, wherein a cutoff frequency in the filtering process performed by the controller is set to a value equal to or less than a resonance frequency of an electrical characteristic of the motor, or a value equal to or less than a resonance frequency of a mechanical system having the motor mounted thereon.

5. The electric power steering control apparatus according to claim 1, wherein the controller comprises one of a low-pass filter, a band-pass filter, and a moving average processing filter, which performs the filtering process.

6. The electric power steering control apparatus according to claim 2, wherein the controller comprises one of a low-pass filter, a band-pass filter, and a moving average processing filter, which performs the filtering process.

7. The electric power steering control apparatus according to claim 3, wherein the controller comprises one of a low-pass filter, a band-pass filter, and a moving average processing filter, which performs the filtering process.

8. The electric power steering control apparatus according to claim 4, wherein the controller comprises one of a low-pass filter, a band-pass filter, and a moving average processing filter, which performs the filtering process.

9. The electric power steering control apparatus according to claim 1, further comprising:

an induced voltage sensor which determines an induced voltage generated in the motor based on detecting a voltage between terminals of the motor; and a vehicle speed sensor which detects a vehicle speed of the vehicle, wherein the controller is further sets a filter characteristic of the filter processing, wherein the controllers changes the filter characteristic based on at least one of the steering torque, the vehicle speed, the target d-axis current value, the target q-axis current value, the current detection value, an increase or decrease of the rotation speed of the motor, and the induced voltage of the motor.

10. The electric power steering control apparatus according to claim 2, further comprising:

an induced voltage sensor which determines an induced voltage generated in the motor based on detecting a voltage between terminals of the motor; and a vehicle speed sensor which detects a vehicle speed of the vehicle, wherein the controller sets a filter characteristic of the filtering process, and wherein the controller changes the filter characteristic based on at least one of the steering torque, the vehicle speed, the target d-axis current value, the target q-axis current value, the current detection value, an increase or decrease of the rotation speed of the motor, and the induced voltage of the motor.

11. The electric power steering control apparatus according to claim 3, further comprising:

an induced voltage sensor which determines an induced voltage generated in the motor based on detecting a voltage between terminals of the motor; and a vehicle speed sensor which detects a vehicle speed of the vehicle, wherein the controller sets a filter characteristic of the filter processing, and wherein the controller changes the filter characteristic based on at least one of the steering torque, the vehicle speed, the target d-axis current value, the target q-axis current value, the current detection value, an increase or decrease of the rotation speed of the motor, and the induced voltage of the motor.

12. The electric power steering control apparatus according to claim 4, further comprising:

an induced voltage sensor which determines an induced voltage generated in the motor based on detecting a voltage between terminals of the motor; and a vehicle speed sensor which detects a vehicle speed of the vehicle;

wherein the controller sets a filter characteristic, and wherein the controller changes the filter characteristic based on at least one of the steering torque, the vehicle speed, the target d-axis current value, the target q-axis current value, the current detection value, an increase or decrease of the rotation speed of the motor, and the induced voltage of the motor.

13. The electric power steering control apparatus according to claim 3, further comprising:

a steering angle sensor which detects a steering angle of the steering wheel; and a returning sensor which detects a returning operation of the steering wheel based on one of the rotation speed of the motor and the steering angle of the steering wheel, wherein the controller further transmits to the filter processing , a command to cancel the filter processing when at least one of a plurality of canceling conditions is satisfied, wherein the plurality of canceling conditions comprise:
(a) when the returning sensor detects the returning operation of the steering wheel; and
(b) when the plurality of execution conditions are all unsatisfied.

14. The electric power steering control apparatus according to claim 4, further comprising:
a steering angle sensor which detects a steering angle of the steering wheel; and
a returning sensor which detects a returning operation of the steering wheel based on one of the rotation speed of the motor and the steering angle of the steering wheel,
wherein the controller further transmits to the filter processing, a command to cancel the filter processing when at least one of a plurality of canceling conditions is satisfied,
wherein the plurality of canceling conditions comprise:
(a) when the returning sensor detects the returning operation of the steering wheel; and
(b) when the plurality of execution conditions are all unsatisfied.

15. The electric power steering control apparatus according to claim 13, wherein the command to cancel the filter processing, which is output by the controller, comprises one of a command to perform processing of returning the filter characteristic to an initial value and a command to change the cutoff frequency of the filter processing to a value higher than a current value.

16. The electric power steering control apparatus according to claim 14, wherein the command to cancel the filter processing, which is output by the controller, comprises any one of a command to perform processing of returning the filter characteristic to an initial value and a command to change the cutoff frequency of the filter processing to a value higher than a current value.

17. A steering control method for assisting, with use of a motor, a steering force of a steering wheel generated by a driver of a vehicle, the steering control method comprising:
detecting a steering torque of the steering force of the steering wheel;
detecting an rotation speed of the motor;
detecting a current value flowing through the motor;
selectively filtering the detected rotation speed;
setting target currents to be supplied to the motor in a d-q coordinate system based on the detected steering torque and the detected rotation speed, wherein the set target currents comprise a target d-axis current value which is set based on the filtered detected rotation speed and a target q-axis current value;
calculating a control amount for driving the motor based on the set target d-axis current value set, the set target q-axis current value, and the detected current value; and
supplying a current to the motor based on the calculated control amount.

18. An electric power steering control apparatus, comprising:
a motor which assists a steering force of a steering wheel generated by a driver of a vehicle;
a torque sensor which detects a steering torque of the steering force of the steering wheel;
a motor rotation speed sensor which detects a rotation speed of the motor;
a motor current sensor which detects a current value flowing through the motor; and
a hardware processor which performs the following operations:
sets target currents supplied to the motor in a d-q coordinate system based on the steering torque detected by the torque sensor and the rotation speed of the motor detected by the motor rotation speed sensor,
calculates a control amount for driving the motor based on a target d-axis current value set by the controller, a target q-axis current value set by the controller, and a current detection value detected by the motor current sensor,
supplies a current to the motor based on the control amount calculated by the controller; and
a filter which subjects the rotation speed of the motor detected by the motor rotation speed sensor to filter processing,
wherein the processor sets the target d-axis current value based on the rotation speed subjected to the filter processing by the filter.

19. The electric power steering control apparatus according to claim 18, wherein the filter is one of a low-pass filter, a band-pass filter, and a moving average processing filter.

20. The electric power steering control apparatus according to claim 18, wherein:
in response to at least one of a plurality of cancellation conditions being satisfied, the processor further generates a command to cancel the filter processing and provides the generated command to cancel the filter processing to the filter, and
wherein the plurality of canceling conditions comprise:
returning operation of the steering wheel, and
the steering torque being lower than or equal to a threshold representing a high torque region and the rotation speed of the motor being lower than or equal to a threshold representing a high rotation speed region, a field weakening control not being executed, change amount of the current detection value being equal to or lower than a threshold representing a high change amount, and when d-axis priority control is not being executed.

* * * * *